(12) United States Patent
Lee et al.

(10) Patent No.: US 7,611,293 B2
(45) Date of Patent: Nov. 3, 2009

(54) 3D ROVER CAMERA SYSTEM AND METHOD

(75) Inventors: Charles C. Lee, Little Canada, MN (US); Bruce H. Koehler, Minneapolis, MN (US)

(73) Assignee: Image Ensemble, Inc., Little Canada, MN (US)

( * ) Notice: Subject to any disclaimer, the term of this patent is extended or adjusted under 35 U.S.C. 154(b) by 463 days.

(21) Appl. No.: 11/512,591

(22) Filed: Aug. 30, 2006

(65) Prior Publication Data
US 2007/0114345 A1    May 24, 2007

Related U.S. Application Data

(60) Provisional application No. 60/712,626, filed on Aug. 30, 2005.

(51) Int. Cl.
| | |
|---|---|
| G03B 17/00 | (2006.01) |
| H04N 7/00 | (2006.01) |
| G03B 35/00 | (2006.01) |
| B62B 3/00 | (2006.01) |
| B62B 7/04 | (2006.01) |

(52) U.S. Cl. .................. 396/428; 348/36; 280/47.11; 352/57

(58) Field of Classification Search ............ 396/5, 396/24, 419, 428; 348/36; 280/79.11; 104/126, 104/307; 352/57; 40/446
See application file for complete search history.

(56) References Cited

U.S. PATENT DOCUMENTS

| | | | | |
|---|---|---|---|---|
| 4,418,993 | A * | 12/1983 | Lipton ..................... 352/57 |
| 4,943,821 | A * | 7/1990 | Gelphman et al. ............. 396/24 |
| 5,473,364 | A | 12/1995 | Burt ............................. 348/47 |
| 5,711,227 | A * | 1/1998 | Johnson ....................... 104/126 |
| 6,145,229 | A * | 11/2000 | Able ............................. 40/446 |
| 6,545,701 | B2 * | 4/2003 | Sinclair et al. ................ 348/36 |
| 7,394,977 | B2 * | 7/2008 | Park et al. ...................... 396/5 |
| 2002/0026300 | A1 | 2/2002 | Shimazaki ..................... 703/2 |
| 2002/0064386 | A1 * | 5/2002 | Losmandy .................. 396/419 |
| 2004/0160512 | A1 | 8/2004 | Lee .............................. 348/42 |
| 2006/0076745 | A1 * | 4/2006 | Gordon .................... 280/79.11 |
| 2007/0095246 | A1 * | 5/2007 | Heiligenmann ............. 104/307 |

FOREIGN PATENT DOCUMENTS

| | | |
|---|---|---|
| GB | 2 259 823 A | 3/1993 |
| WO | WO 97/03416 | 1/1997 |

* cited by examiner

*Primary Examiner*—Melissa J Koval
(74) *Attorney, Agent, or Firm*—Patterson, Thuente, Skaar & Christensen, P.A.

(57) ABSTRACT

Systems, methods and apparatus related to a motorized platform for use in creating three dimensional images. The motorized platform includes a symmetrical steering system such that a digital camera remains focused upon a desired image target as the motorized platform is advanced. The symmetrical steering system includes a three-wheel arrangement providing a constant radius path around the image target. A pair of steerable wheels located on an inside edge of the motorized platform are operably connected with a steering linkage assembly such that the steerable wheels are angularly adjusted to define the constant radius path. A drive wheel is operably connected to a motor assembly for propelling the motorized platform along the constant radius path. A digital camera can be mounted to a tripod attached to the motorized platform and the digital camera can be operably controlled either manually or automatically as the motorized platform is advanced.

17 Claims, 10 Drawing Sheets

3D ROVER CAMERA SYSTEM AND METHOD

PRIORITY CLAIM

The present application claims priority to U.S. Provisional Patent Application Serial No. 60/712,626, filed Aug. 30, 2005 and entitled "3D ROVER CAMERA SYSTEM AND METHOD", which is herein incorporated by reference in its entirety.

FIELD OF THE INVENTION

The present application is directed to methods and apparatus for creating three dimensional pictures of stationary objects. More particularly, the present application is directed to a motorized platform having a symmetrical steering assembly for advancing a digital camera along an arcuate travel path for taking a plurality of pictures of an object that can be processed to form a three dimensional image.

BACKGROUND OF THE INVENTION

The use of three dimensional images in advertising, photography and sign making has increased dramatically in recent years. This increased use comes as a direct result of technological advances in the fields of computing, software, digital printing and digital photography in combination with the increased availability of low-cost materials for constructing the images.

Traditionally, three dimensional images have been constructed using one of the following methods. In a first method referred to as a "moving camera method", a still camera takes pictures of a stationary object at equal distances along a linear slider member, wherein the pictures of the sequential views are processed with appropriate imaging software. In a second method referred to as a "linear arrayed multi-camera method", a plurality of photographs are taken around a stationary or moving object using a plurality of cameras, wherein the photographs are again processed with the imaging software. Finally, a third method involves the use of 3D software to convert standard two dimensional images into layered images.

Recognizing the inherent deficiencies of each of the identified methods for creating three dimensional images, the present inventors developed a novel, automated system for taking two-dimensional, digital images at various locations around a target and converting these two-dimensional images into a true, three dimensional image. This automated system for creating three dimensional images is disclosed and described in U.S. patent publication 2004/0160512A1, filed Feb. 17, 2004 and entitled "3D CAMERA SYSTEM AND METHOD", which is herein incorporated by reference in its entirety.

As part of this automated system, one or more cameras are described as being mounted upon a motorized platform for transporting the cameras on a desired path of travel. The motorized platform is formed of separable pieces wherein a linkage system operably connected sets of wheels on each of the separable pieces. While the previously described system and motorized platform can be used to successfully create 3D images, it would be advantageous to further improve on the disclosed system and motorized platform.

SUMMARY OF THE INVENTION

The present invention is generally directed to a motorized platform having a symmetrical steering system such that a digital camera mounted upon the motorized platform remains pointed and focused upon a desired image target as the motorized platform is advanced. The symmetrical steering system comprises a three-wheel arrangement allowing the motorized platform to move along a constant radius path around the image target. A pair of steerable wheels located on an inside edge of the motorized platform are operably connected with a steering linkage assembly such that the steerable wheels are angularly adjusted to define the constant radius path. A third wheel is located on an outside edge of the motorized platform. Any one of the steerable wheels or the third wheel can be operably connected to a motor assembly for propelling the motorized platform along the constant radius path. A digital camera can be mounted to a tripod attached to the motorized platform and the digital camera can be operably controlled through a manual input or through interconnection to a controller on the motorized platform. As the drive wheel propels the motorized platform along the constant radius path, a plurality of digital images of the image target are captured and can be subsequently processed with suitable interlacing software for creating a three dimensional image.

In one aspect, the present invention comprises a system for taking a plurality of digital images of an image target for constructing a three dimensional picture of the image target. A representative system can comprise a motorized platform having a symmetrical steering system, a digital camera and image processing software. The motorized platform comprises a three wheel arrangement having two steerable wheels on an inside edge of the motorized platform and a single drive wheel on the outside edge of the motorized platform. The steerable wheels are operably interconnected with a steering linkage such that turning the wheels defines a constant radius path upon which the motorized platform is advanced. The digital camera captures a plurality of digital images of the image target as the motorized platform moves along the constant radius path and the image processing software combines the digital images to form a three dimensional image. Using the symmetrical steering system, the digital camera remains pointed and focused upon the image target as the motorized platform moves regardless of the distance between the digital camera and the image target.

In another aspect, the present invention is directed to a motorized platform for creating three dimensional images of an image target. The motorized platform comprises a symmetrical steering system allowing the motorized platform to move along a constant radius path around the image target. The symmetrical steering system comprises a pair of steerable wheels mounted along an inside edge of the motorized platform, which are operably connected with a steering linkage assembly such that the steerable wheels are angularly adjusted to define the constant radius path. The steering linkage assembly can comprise a distance adjustment assembly for adjustably, angularly positioning the steerable wheels such that the radius of the travel path corresponds to a distance between the motorized platform and the image target. The motorized platform includes a drive wheel on an outside edge of the motorized platform that is operably connected to a to a motor assembly for propelling the motorized platform along the constant radius path. The motorized platform includes a mounting assembly for attaching a digital camera to the motorized platform. The digital camera can be manually controlled by a user or can be operably controlled through interconnection to a controller on the motorized platform.

In yet another aspect, the present invention is directed to a method of forming a three dimensional image of a stationary target object. The method can comprise providing a motorized platform having a symmetric steering assembly wherein a pair of steerable wheels define an arcuate travel path of the motorized platform, attaching a digital camera to the motorized platform such that the digital camera is pointed at a center of rotation of the arcuate travel path, wherein the center of rotation corresponds to the location of the target object, advancing the motorized platform along the arcuate travel path and capturing images of the target object with the digital camera as the motorized platform moves along the arcuate travel path. The captured images can then be processed with suitable image processing software to form a three dimensional image of the target object. The method can further comprise adjusting the angular displacement of the steerable wheels such that the arcuate travel path has a radius equal to the distance between the stationary target object and the motorized platform.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

These as well as other objects and advantages of this invention, will be more completely understood and appreciated by referring to the following more detailed description of the presently preferred exemplary embodiments of the invention in conjunction with the accompanying drawings of which.

DETAILED DESCRIPTION OF THE DRAWINGS

As illustrated in FIGS. 1, 2, 3, 4 and 5, a representative embodiment of a motorized platform 100 for use in creating three dimensional (3D) images can comprise a mounting surface 102, a symmetrical steering assembly 104, a drive assembly 106 and a tripod attachment assembly 108. As will be described in further detail below, motorized platform 100 provides a photographer the ability to take multiple pictures along an arcuate path surrounding an image target such that a 3D picture of the image target can be created.

As depicted in FIGS. 1-5, mounting surface 102 is generally defined by a top surface 110, a bottom surface 112, a front edge 114, a rear edge 116, an inside edge 118 and an outside edge 120. Mounting surface 102 can be fabricated using rigid materials such as, for example, wood, metals or plastic sheets. Front edge 114 can in some embodiments include an opening 121 at a midpoint location between the front edge 114 and rear edge 116.

Figure 6:
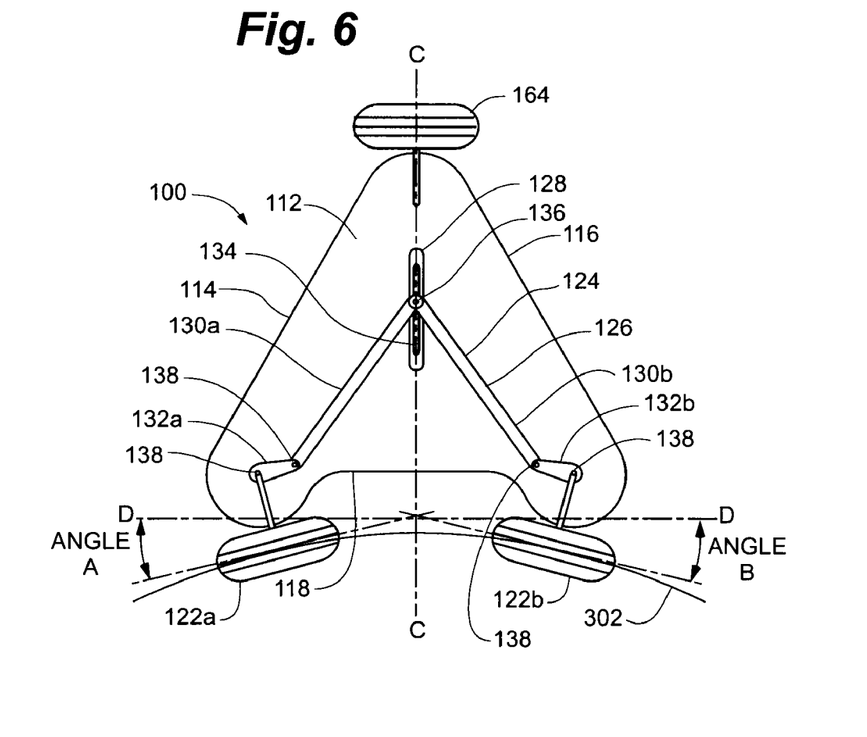
FIG. 6 is a bottom view of an embodiment of a symmetrical steering assembly attached to a motorized platform of the present invention.

Symmetrical steering assembly 104 generally comprises a pair of steerable wheels 122a, 122b and a steering linkage 124. Steerable wheels 122a, 122b are generally, operably mounted to the mounting surface 102 at opposite ends of the inside edge 118. Steering linkage 124 is mounted to the bottom surface 112 at a midpoint location between the steerable wheels 122a, 122b. Steering linkage 124 operably attaches the steerable wheels 122a, 122b such that each wheel is equally turned in an opposite direction relative to the inside edge 118 such that the steerable wheels assume a pair of generally equivalent turning angles A and B defined by generally by a midpoint line C and a line D parallel to inside edge 118 as shown in FIG. 6. As described below, steering linkage 124 can comprise a variety of steering configurations for turning the steerable wheels 122a, 122b.

Referring to FIG. 6, one representative embodiment of steering linkage 124 can comprise a long bar configuration 126 having a slider bar 128, a pair of steering arms 130a, 130b and a pair of linkage arms 132a, 132b. Slider bar 128 can define an open slider channel 134 for accommodating a slider pin 136. Slider bar 128 can include a distance scale 129 on the upper side of the slider bar 128 and along the open slider channel 134. The slider pin 136 is positionable through the slider channel 134 and a pair of bores on the linkage arms 130a, 130b such that increased diameter portions on the ends of the slider pin 136 such as, for example, washers, nuts and the like, such that the steering arms 130a, 130b are slidably engaged with the slider channel 134. An indicator member 137 can be attached on the upper portion of the slider pin 136 such that the indicator member 137 is visible along and visually interfaces with the distance scale 129. Utilizing a plurality of fasteners 138, the steering arms 130a, 130b are rotatably coupled to the linkage arms 132a, 132b, which are in turn attached to the steerable wheels 122a, 122b. As the slider bar 128 is mounted at a midpoint position between the steerable wheels 122a, 122b and the steering arms 130a, 130b and linkage arms 132a, 132b are equal lengths, varying the position of the slider pin 136 within the slider channel 134 causes each of the steerable wheels 122a, 122b to assume an opposite, but equivalent turning angle A, B with respect to the midpoint line C and line D.

Figure 7A:
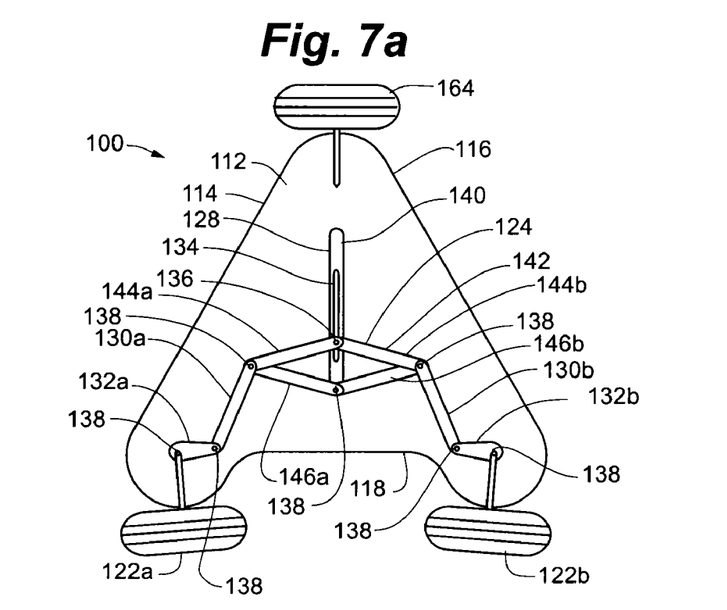
FIG. 7a is a bottom view of an embodiment of a symmetrical steering assembly attached to a motorized platform of the present invention.

Referring to FIG. 7a, an alternative embodiment of steering linkage 124 can comprise a short bar configuration 140 having slider bar 128, an angled divider 142, steering arms 130a, 130b and linkage arms 132a, 132b. Slider bar 128 again includes open slider channel 134 accommodating slider pin 136. Angled divider 142 generally comprises a pair of fixed arms 144a, 144b and a pair of sliding arms 146a, 146b. The slider pin 136 mounts through the slider channel 134 and a pair of bores on the sliding arms 146a, 146b such that the sliding arms 146a, 146b are slidably engaged with the slider channel 134. Utilizing fasteners 138, one end of the fixed arms 144a, 144b are mounted to the slider bar 128 and the other end is attached to the sliding arms 146a, 146b. The fasteners 138 are also used to rotatably attach the steering arms 130a, 130b with the angled divider 142 and to rotatably couple the steering arms 130a, 130b with the linkage arms 132a, 132b as well as the steerable wheels 122a, 122b. Once again, the slider bar 128 is mounted at a midpoint position between the steerable wheels 122a, 122b and the fixed arms 144a, 144b, sliding arms 146a, 146b, steering arms 130a, 130b and linkage arms 132a, 132b are equal lengths such that varying the position of the slider pin 136 within the slider channel 134 causes each of the steerable wheels 122a, 122b to assume an opposite, but equivalent turning angle A, B with respect to the midpoint line C and line D.

Figure 7B:
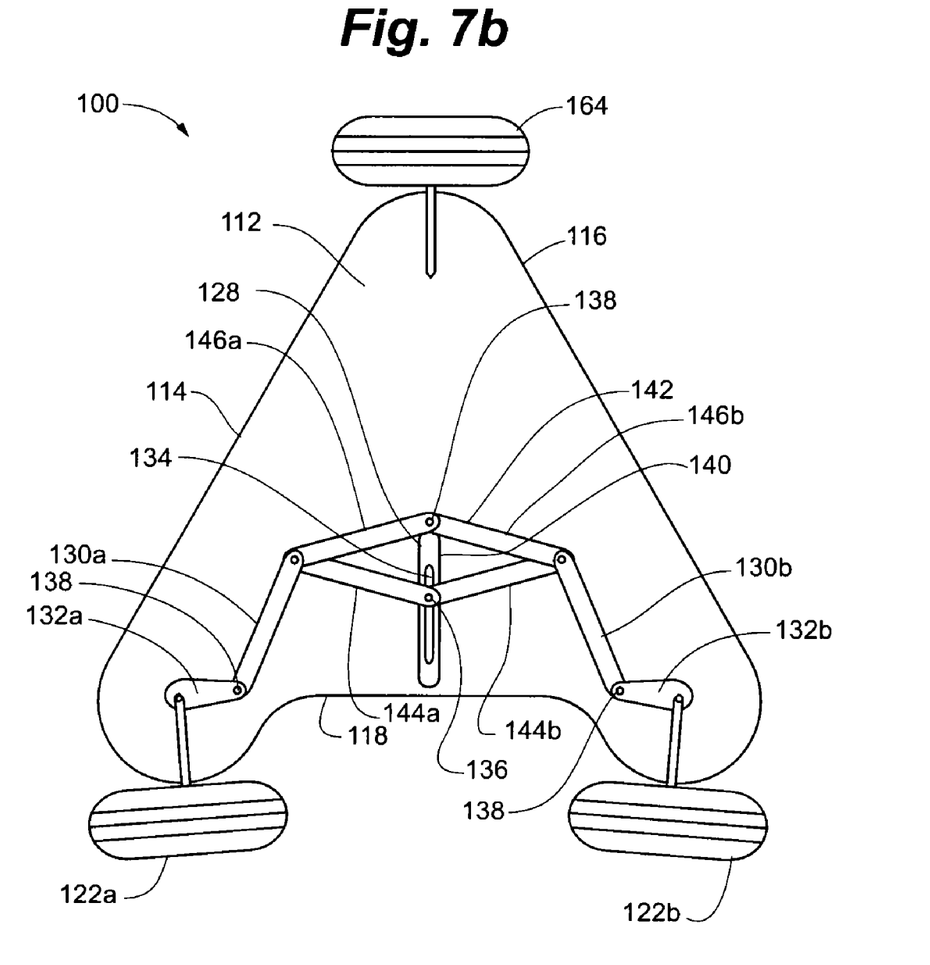
FIG. 7b is a bottom view of an embodiment of a symmetrical steering assembly attached to a motorized platform of the present invention.

As illustrated in FIG. 7b, a variation on short bar configuration 140 can include a repositioned slider bar 128 and a reversed angled divider 142. With the reversed angle divider 142, the relative location of the fixed arms 144a, 144b and sliding arms 146a, 146b are reversed. However, steerable wheels 122a, 122b are still biased together to define opposite but equal turning angles A, B.

Referring again to FIGS. 1-5, drive assembly 106 can comprise a drive mount 150, a motor 152, a power source 154, a gear box 156, a drive shaft 158, a drive belt 160, a reducing gear 162 and a drive wheel 164. While drive wheel 164 is depicted as being located along outside edge 120, it will be understood drive wheel 164 can simply take the form of a third wheel that any one of the three depicted wheels, steerable wheels 122a, 122b or drive wheel 164, can be driven with the drive assembly 106 without altering the performance of the motorized platform 100. Motor 152 generally comprises a DC electrical motor. Power source 154 generally comprises a replaceable or rechargeable battery such as, for example, a 6 or 12 volt battery. Drive assembly 106 is designed to advance the motorized platform 100 at a slow speed, preferably less than or equal to 1 ft/sec. In some embodiments, motor 150 and gear box 156 are capable of turning drive shaft 158 at a rate less than 1 ft/sec. In other embodiments, reducing gear 162 is used to reduce the output of motor 150 and gear box 156 such that drive wheel 164 advances at or less than about 1 ft/sec.

Figure 1:
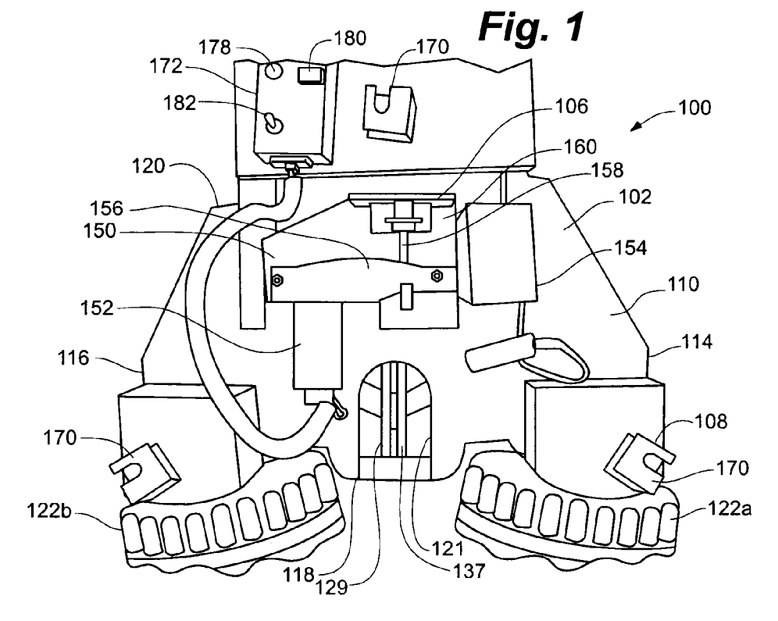
FIG. 1 is a plan view of an embodiment of a motorized platform of the present invention.
Figure 2:
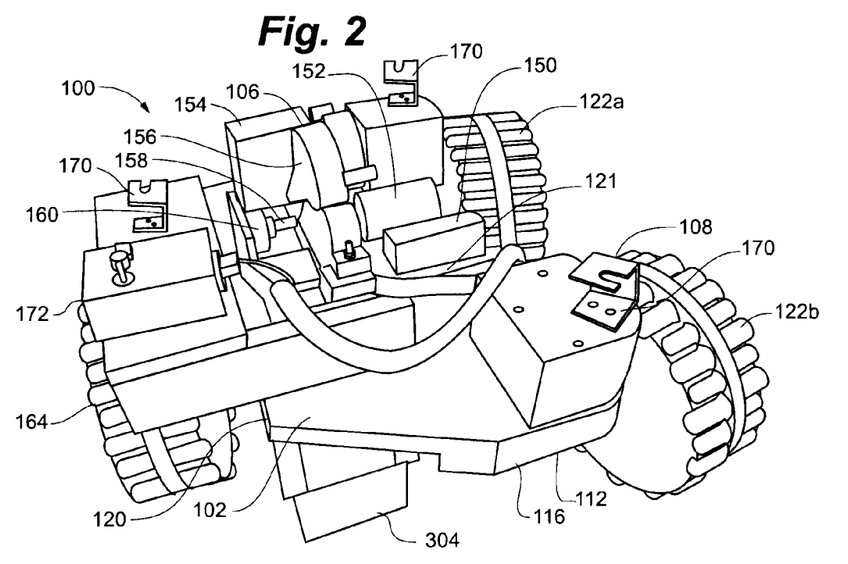
FIG. 2 is a rear, perspective view of the motorized platform of FIG. 1.
Figure 3:
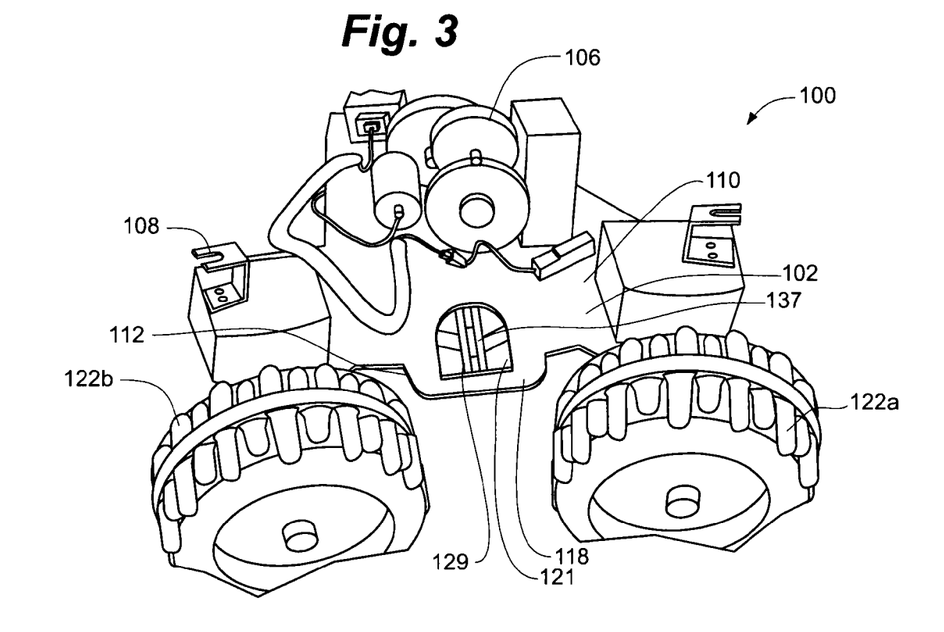
FIG. 3 is an inside, perspective view of the motorized platform of FIG. 1.
Figure 4:
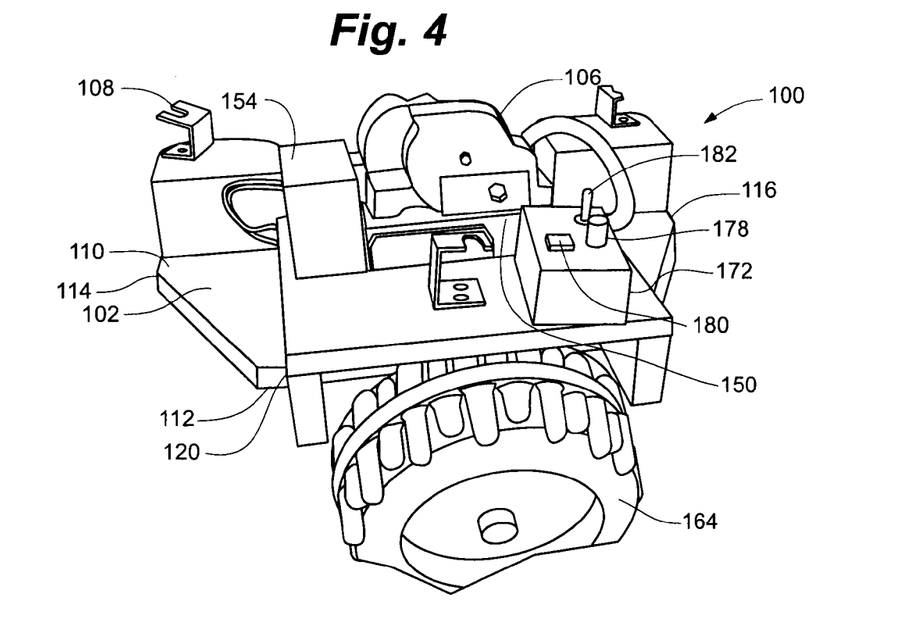
FIG. 4 is an outside, perspective view of the motorized platform of FIG. 1.
Figure 5:
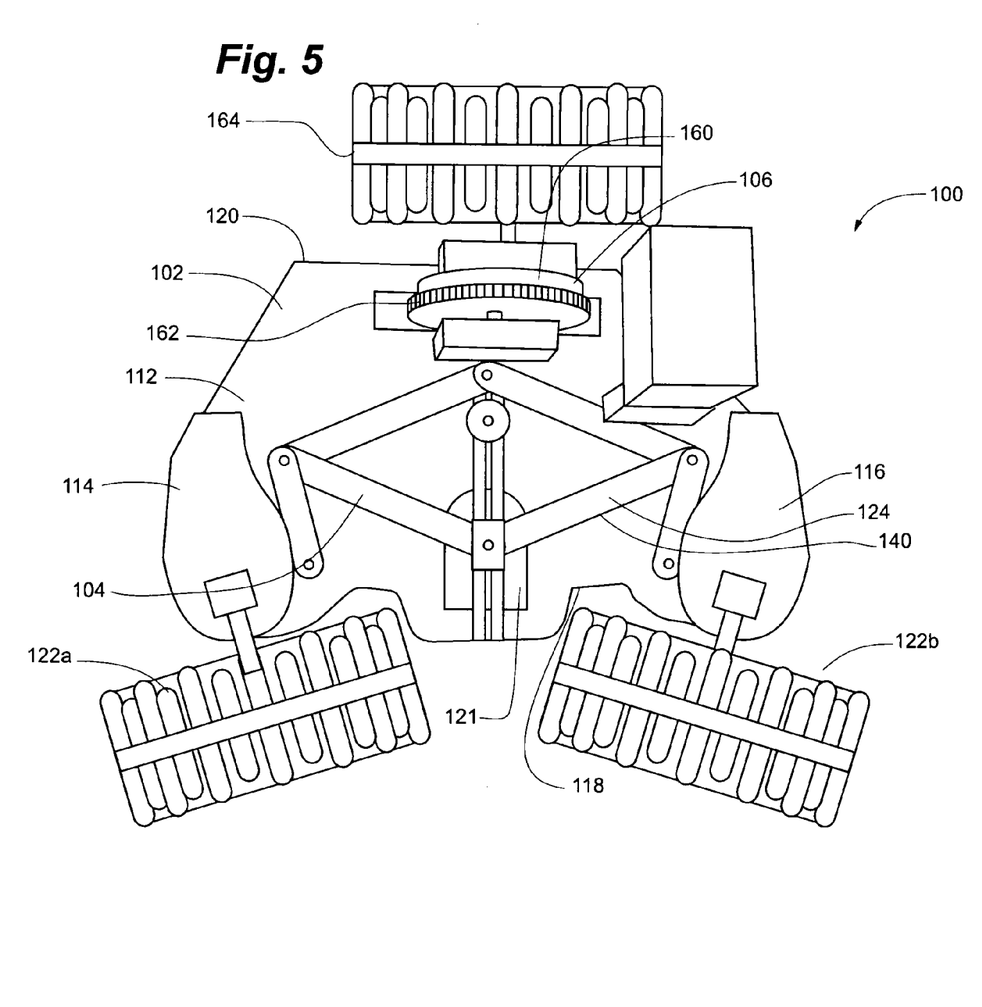
FIG. 5 is a bottom, view of the motorized platform of FIG. 1.

As best illustrated in FIGS. 1, 2 and 4, drive assembly is generally operably controlled with a control assembly 172. Control assembly 102 can include a speed control knob 178, a start/stop switch 180 and a direction switch 182. Control assembly 172 can further comprise a remote platform control 183 allowing a user to remotely manipulate the motorized platform 100. Speed control knob 178, start/stop switch 180 and direction switch 182 are operably, electrically interconnected to the motor 152 such that drive assembly 106 can be turned on and off, directed forward and back and allow the speed at which drive wheel 164 is turned to be varied. As discussed previously, it is advantageous that speed control switch 180 selectively controls the speed of drive wheel 164 up to a maximum speed of about 1 ft/sec. The speed of drive wheel 164 is generally selected based upon a camera frame rate or shutter trip rate as well as the desired travel distance between frame capture such as, for example, every 0.5 inches.

Referring to FIGS. 1-4, tripod attachment assembly 108 generally comprises a plurality of mounting brackets 170. Mounting brackets 170 are generally fixed to top surface 110 and can be arranged such that mounting brackets 170 are located proximate steerable wheels 122a, 122b and drive wheel 164.

Figure 8:
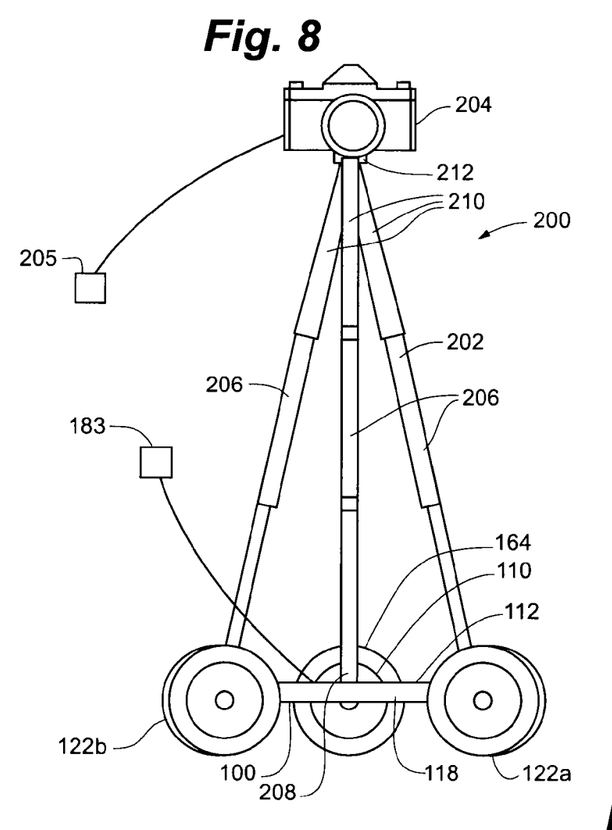
FIG. 8 is a side view of an embodiment of a three dimensional camera system of the present invention.
Figure 9:
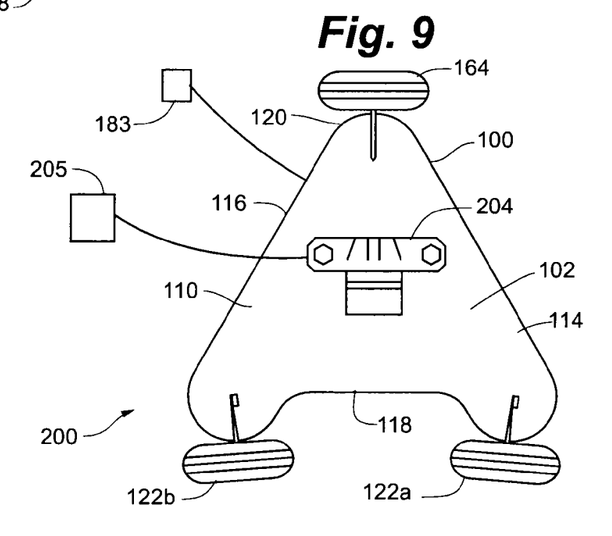
FIG. 9 is a plan view of the three dimensional camera system of FIG. 8.

As illustrated in FIGS. 8 and 9, an embodiment of a 3D camera system 200 can comprise the motorized platform 100, a tripod 202 and a digital camera 204. Tripod 202 generally comprises three legs 206, wherein each leg comprises a foot 208 for operable connection with mounting brackets 170. Tripod 202 can further comprise a height adjustment arm 210 and a camera mount 212. Height adjustment arm 210 is preferably vertically adjustable such that camera mount 212 can be elevated to a desired height such as, for example about six feet from mounting surface 102 for taking pictures of people.

Digital camera 204 can comprise any of a variety of commercially available digital cameras available from companies such as, for example, Canon, Nikon and the like. In one representative embodiment, digital camera 204 has a continuous shooting mode capable of taking from about 1 to about 8 shots per second and can have a remote switch 205 for activating the continuous shooting mode. One digital camera 204 that achieves these shooting results is a Canon Digital SLR 20D with a remote switch Model RS-80N3. In other embodiments, digital camera 204 can comprise a digital video camera or High-Definition (HD) video camera capable of filming 15 or 30 shots per second.

Figure 10:
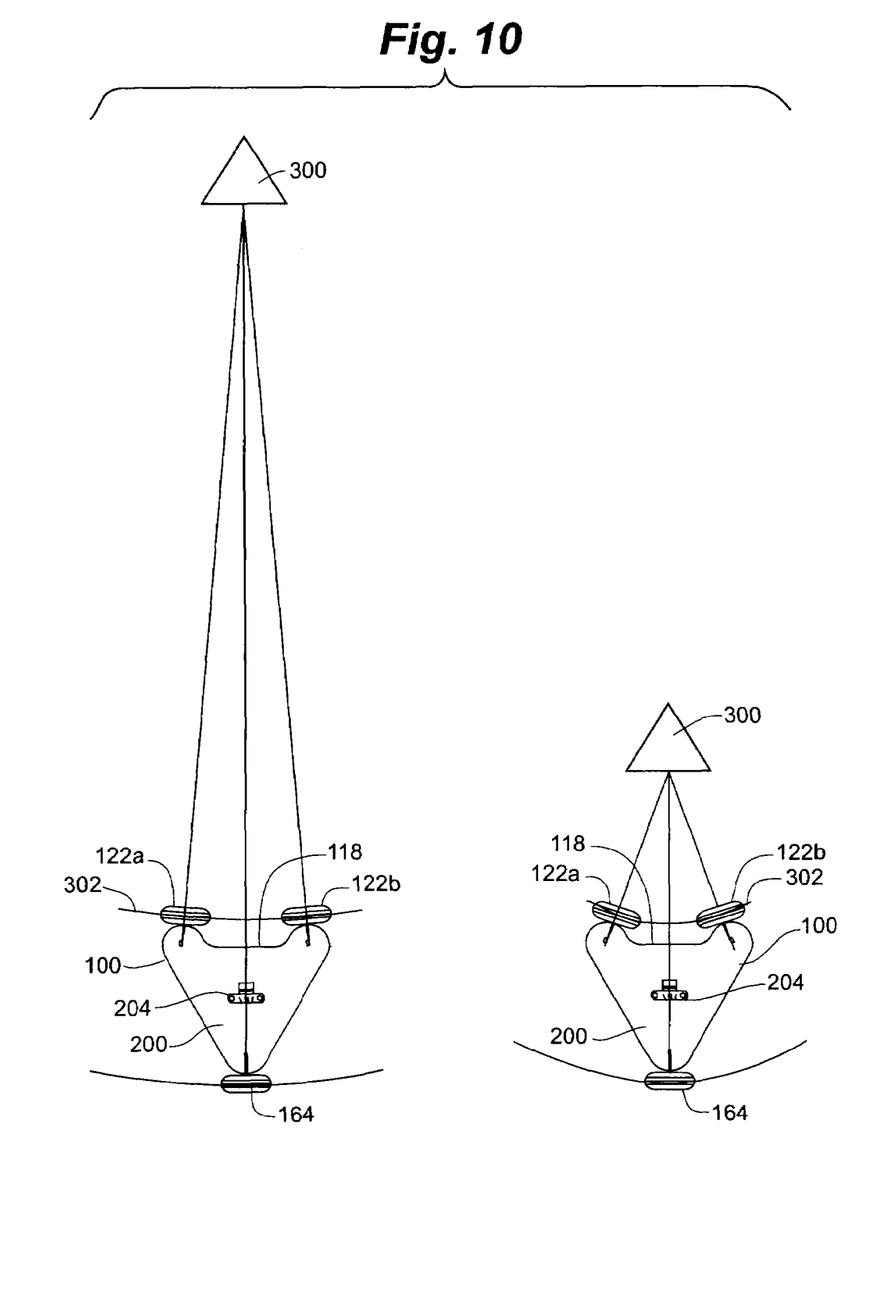
FIG. 10 is a plan view of a three dimensional camera system having a symmetrical steering assembly of the present invention set to capture images of a target object at both close and far distances.

In use, 3D camera system 200 is positioned at a selected distance form a stationary target object 300 as illustrated in FIG. 10. Target object 300 can comprise any of a variety of image targets such as, for example, human beings, commercial products, environmental objects and the like. Camera system 200 is positioned such that inside edge 118 faces the target object 300 while outside edge 120 faces away from the target object 300. The user then measures the distance between the inside edge 118 and the target object 300. Using the indicator member 137, the user positions the indicator member 137 on the distance scale 129 at a point corresponding to the measured distance between the inside edge 118 and the target object 300. By adjusting the indicator member 137, the symmetrical steering assembly 104 is set such that angles "A" and "B" define a constant radius arc 302, wherein the radius equals the measured distance between the inside edge 118 and the target object 300. Finally, the user adjusts the vertical adjustment arm 210 and focuses the digital camera 204 such that 3D camera system 200 captures target object 300 at a desirable orientation and image size.

Once the user has positioned and adjusted the 3D camera system 200, the user initiates movement of the motorized platform 100 by engaging start/stop switch 180. Start/stop switch 180 causes motor 152 to begin turning the drive wheel 164 such that the motorized platform 100 begins advancing along constant radius path 302. As 3D camera system 200 advances, the digital camera 204 begins snapping pictures of target object 300. Initiation of digital camera 204 can be by the user through the remote switch, by the user pressing a snap button with the digital camera 204 in a continuous shooting mode, by electrically interconnecting the remote switch with start switch 178 or by interconnecting an encoder with the camera 204 and motor 152 such that images are captured at precise distance intervals. Alternatively, motorized platform 100 can further comprise a photoeye 304 as illustrated in FIG. 2 that is electrically interconnected to the digital camera such that by using a fan-shaped grating sheet positioned along the constant radius path as described in U.S. patent publication 2004/-0160512A1, which has previously been incorporated by reference, the photoeye selectively triggers the taking of a digital image at precise intervals defined by the grating sheet. When digital camera 204 comprises a video camera or HD video camera, filming of the target object 300 is essentially continuous such that precise control of the image capture by the digital camera 204 is unnecessary.

Figure 11:
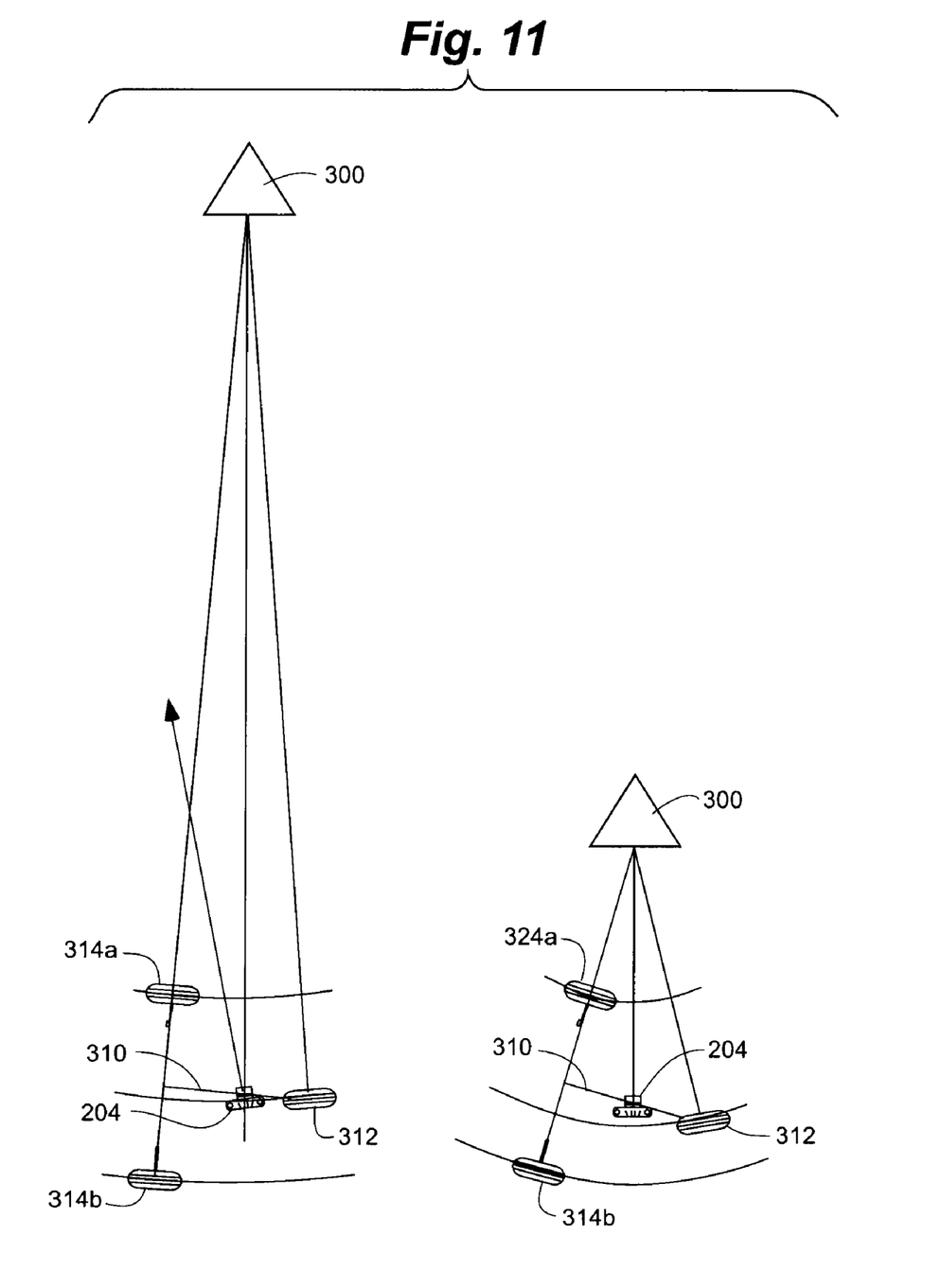
FIG. 11 is a plan view of a three dimensional camera system having a traditional tricycle steering system set to capture images of a target object at both close and far distances.

Comparing FIG. 10 with FIG. 11, the benefit of 3D camera system 200, and more specifically, the motorized platform 100 is illustrated. Through the use of symmetrical steering assembly 104 and drive assembly 106 as described herein, the center of rotation of the motorized platform 100 can be easily adjusted and maintained around the image target 300. In this way, the digital camera 204 remains pointed and focused upon the image target 300 without any manual intervention as the motorized platform 100 is moved along the constant radius path. As the steering angles "A" and "B" are adjustable and equal, the constant radius path is adjustable based upon the picture taking conditions and the desired target in the scene, while the digital camera 204 remains pointed and focused at the target object 300. In addition, motorized platform 100 making use of the three wheels, steerable wheels 122a, 122b and drive wheel 164, provides the further advantage of define a plane such that the 3 wheels will always remain in contact with the ground even if the ground surface is uneven. This means that the steering and drive capabilities of the motorized platform 100 are always maintained without requiring the use of complicated suspension system as are required with typical four wheel configurations. In addition, the three-wheel system is well suited for use with tripod 202 as the load from each leg 206 can be centered over a wheel. Referring to FIG. 11, the disadvantages of a traditional tricycle steering assembly 310 are illustrated. Traditional tricycle steering assembly 310 with a front steerable wheel 312 and two, fixed position rear wheels 314a, 314b does not allow digital camera 204 to remain pointed focused upon image target 300 when the distance between the image target 300 and digital camera 204 is varied.

Once the 3D camera system 200 has advanced a desired length along the constant radius path 302, the user actuates the start/stop switch 180 to stop the motor 152. In some embodiments, the start/stop switch 180 can stop any further image capture by the digital camera 204 or the user can manually stop the digital camera 204. In the case of motorized platform 100 including photoeye 304, the elimination of further advancement along the fan-shaped grating sheet can automatically terminate further image capture by the digital camera 204. At this point, the user can removed the digital camera 204 and download the captured images for processing by appropriate interlacing software such as, for example, SuperFlip. The processed image can then be mounted or printed to the back of a lenticular lens sheet.

Figure 12:
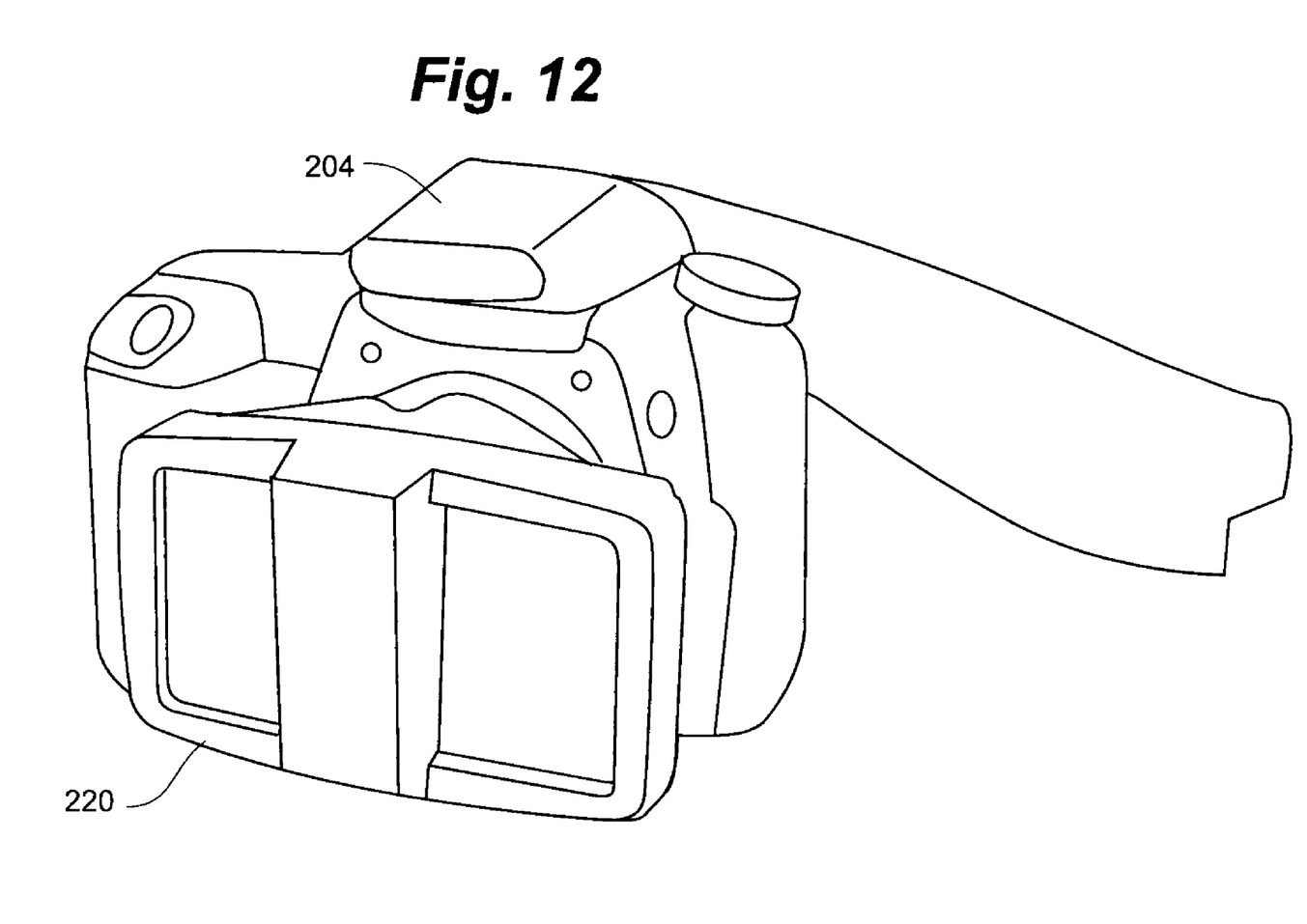
FIG. 12 is a perspective view of a digital camera having a stereo image lens for use with the three dimensional camera system of FIG. 8.
Figure 13:
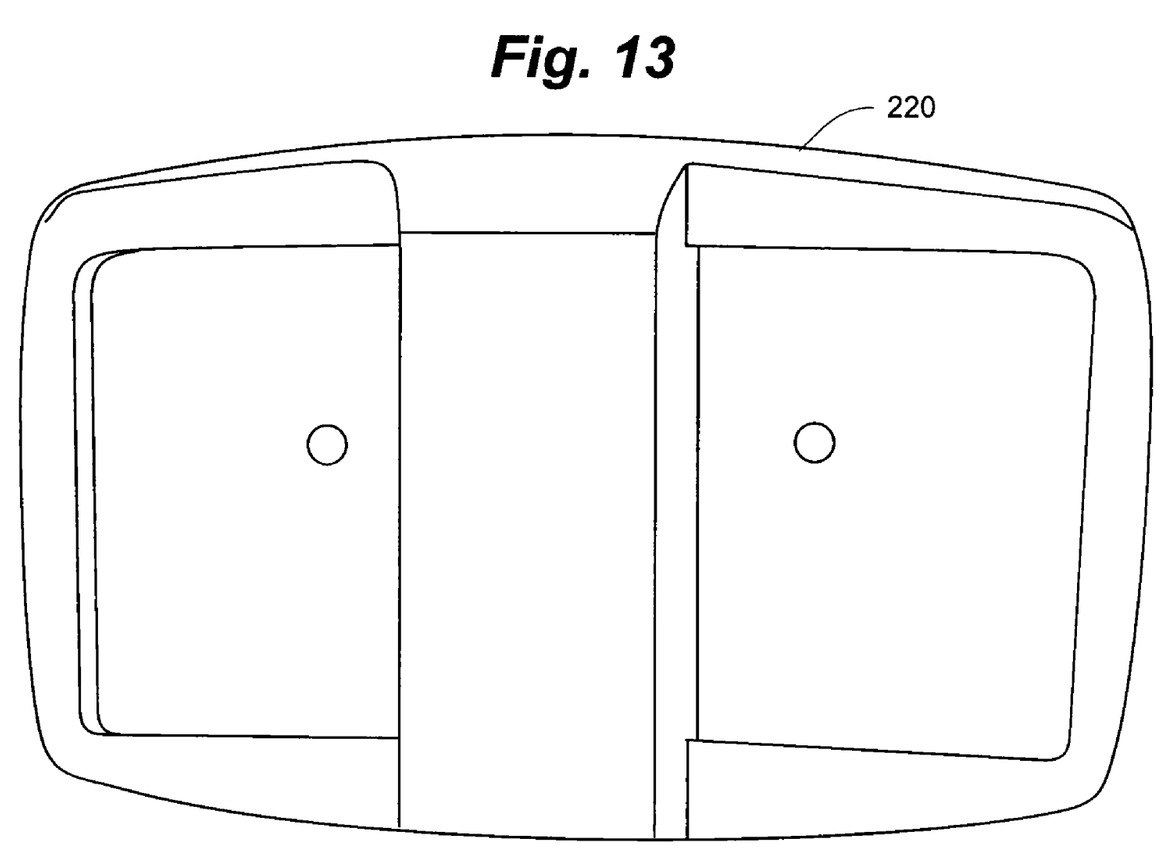
FIG. 13 is an end view of the stereo image lens of FIG. 12.

In some embodiments, image capture by the 3D camera system 200 can be further enhanced through the use of a stereo image lens 220 attached to the digital camera 204. Stereo image lens 220 allows the single digital camera 204 to take two simultaneous images from slightly different perspectives. Stereo image lens 200 can comprise a commercially available stereo image lens available from companies such as, for example, Loreo or Pentax. In prior systems for taking 3D pictures, two separate cameras were utilized to take stereo images. This required the use of complicated controls between the two camera such that the image capture was simultaneous and time sequenced. Through the use of stereo image lens 220, only one digital camera 204 need be controlled to take a time sequenced, stereo image. Using a single digital camera 204 with stereo image lens 200, a resulting 3D picture will have its motion blur significantly reduced or eliminated without requiring time synchronization of two individual cameras.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The invention claimed is:

1. An automated system for taking three dimensional images comprising:
   a motorized platform having a mounting surface and a symmetric steering assembly, the symmetric steering assembly having a pair of steerable wheels mounted on an inside edge of the mounting surface, a steering linkage operably connecting the pair of steerable wheels such that the steerable wheels are positionable at equal but opposite steering angles to define a constant radius along an arcuate path and a third wheel mounted on an outside edge of the mounting surface, wherein one of the steerable wheels or the third wheel is driven by a drive assembly; and
   a digital camera operably attached to the mounting surface, wherein the digital camera remains pointed at a center of rotation as the motorized platform advances along an arcuate path defined by the steerable wheels with the inside edge facing the center of rotation.

2. The automated system of claim 1, further comprising:
   a tripod having a leg portion and a camera mounting portion, the leg portion attached to the mounting surface and the digital camera attached to the camera mounting portion.

3. The automated system of claim 2, wherein the tripod includes a vertical adjustment member connecting the leg portion and the camera mounting portion, the vertical adjustment member allowing the digital camera to be elevated above the mounting surface.

4. The automated system of claim 1, wherein the drive assembly comprises a gear box and a belt drive assembly, wherein the belt drive assembly interfaces with a drive wheel selected from the pair of steerable wheels and the third wheel to propel the motorized platform along the arcuate path.

5. The automated system of claim 1, wherein the digital camera comprises a digital camera having a continuous shooting mode capable of shooting about 1 to about 8 shots per second.

6. The automated system of claim 1, wherein the digital camera includes a stereo lens for simultaneously taking two, time synchronized stereo pictures.

7. A method for forming three dimensional images comprising:
   providing a motorized platform having a symmetric steering assembly with a pair of steerable wheels mounted on an inside edge of the motorized platform and a third wheel on an outside edge of the motorized platform, the pair of steerable wheels operably connected with a steering linkage such that the steerable wheels are positionable at equal but opposite steering angles defining an arcuate travel path of the motorized platform, said arcuate travel path having a constant radius;
   attaching a digital camera to the motorized platform such that the digital camera is pointed at a center of rotation of the arcuate travel path;

advancing the motorized platform along the arcuate travel path with the inside edge facing the center of rotation; and capturing images with the digital camera as the motorized platform moves along the arcuate travel path.

8. The method of claim 7, further comprising:
processing the images with an interlacing software.

9. The method of claim 8, further comprising:
affixing or printing a processed image to a lenticular lens sheet.

10. The method of claim 7, wherein advancing the motorized platform comprises driving one of the steerable wheels or the third wheel with a motor assembly.

11. The method of claim 7, wherein capturing images with the digital camera comprises snapping between one to about thirty pictures per second as the motorized platform moves along the arcuate travel path.

12. The method of claim 7, wherein attaching the digital camera to motorized platform comprises attaching the digital camera to a tripod mounted on the motorized platform such that the digital camera is vertically positionable above the motorized platform.

13. The method of claim 7, wherein capturing images with the digital camera comprises remotely triggering the camera with a means for triggering such that the images are captured at precise locations along the arcuate travel path.

14. A motorized platform for taking three dimensional pictures comprising:
a mounting surface having a pair of steerable wheels positioned along an inside edge and a third wheel mounted along an outside edge, the pair of steerable wheels operably interconnected with a steering linkage such that adjustment of the steering linkage positions each of the steerable wheels at equal but opposite steering angles defining a constant radius travel path for the motorized platform with the inside edge facing an image target; and
a drive assembly propelling one the pair of steerable wheels or the third wheel.

15. The motorized platform of claim 14, wherein the mounting surface comprises a tripod mounting assembly for operably attaching a tripod to a top surface of the mounting surface.

16. The motorized platform of claim 14, wherein the drive assembly comprises a motor capable of advancing the motorized platform at a rate up to about one foot per second.

17. The motorized platform of claim 14, wherein the steering linkage includes an adjustable scale for varying the steering angle of each steerable wheel such that a radius of the constant radius travel path corresponds to a distance from the inside edge to the image target.

* * * * *

UNITED STATES PATENT AND TRADEMARK OFFICE
CERTIFICATE OF CORRECTION

PATENT NO. : 7,611,293 B2 Page 1 of 1
APPLICATION NO. : 11/512591
DATED : November 3, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this

Twelfth Day of October, 2010

David J. Kappos
*Director of the United States Patent and Trademark Office*